United States Patent
Chang et al.

(10) Patent No.: US 9,129,606 B2
(45) Date of Patent: Sep. 8, 2015

(54) USER QUERY HISTORY EXPANSION FOR IMPROVING LANGUAGE MODEL ADAPTATION

(75) Inventors: Shuangyu Chang, Fremont, CA (US); Michael Levit, San Jose, CA (US); Bruce Melvin Buntschuh, Mountain View, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 385 days.

(21) Appl. No.: 13/242,912

(22) Filed: Sep. 23, 2011

(65) Prior Publication Data

US 2013/0080162 A1 Mar. 28, 2013

(51) Int. Cl.
| | |
|---|---|
| *G10L 15/02* | (2006.01) |
| *G06F 17/24* | (2006.01) |
| *G06F 3/0482* | (2013.01) |
| *G10L 15/34* | (2013.01) |

(52) U.S. Cl.
CPC ..................................... *G10L 15/34* (2013.01)

(58) Field of Classification Search
CPC ... G10L 15/063; G10L 15/142; G10L 15/265; G10L 15/02; G06F 17/2785; G06F 17/30864; G06F 17/30286; G06F 17/273; G06F 17/24; G06F 17/241; G06F 3/0482
USPC .............. 704/243, 256, 9, 275, 236; 707/707, 707/706, 769, 709, 723, 762; 715/810, 257, 715/205, 232, 201
See application file for complete search history.

(56) References Cited

U.S. PATENT DOCUMENTS

| | | | |
|---|---|---|---|
| 6,226,361 B1 * | 5/2001 | Koyama ..................... | 379/88.07 |
| 6,484,136 B1 * | 11/2002 | Kanevsky et al. ................ | 704/9 |
| 7,672,931 B2 | 3/2010 | Hurst-Hiller et al. | |
| 7,788,099 B2 | 8/2010 | Haubold et al. | |
| 7,953,746 B1 * | 5/2011 | Garg et al. ..................... | 707/762 |
| 8,131,540 B2 * | 3/2012 | Marchisio et al. ................ | 704/9 |
| 8,209,178 B1 * | 6/2012 | Talbot et al. .................. | 704/255 |
| 8,214,210 B1 * | 7/2012 | Woods .......................... | 704/236 |
| 8,341,142 B2 * | 12/2012 | Sejnoha et al. ............... | 707/707 |
| 8,429,146 B2 * | 4/2013 | Shen et al. .................... | 707/706 |
| 8,447,608 B1 * | 5/2013 | Chang et al. .................. | 704/257 |
| 8,521,526 B1 * | 8/2013 | Lloyd et al. ................... | 704/236 |
| 8,630,860 B1 * | 1/2014 | Zhang et al. .................. | 704/275 |
| 8,914,286 B1 * | 12/2014 | Secker-Walker et al. ...... | 704/244 |
| 2005/0015368 A1 * | 1/2005 | Payton et al. ..................... | 707/4 |

(Continued)

OTHER PUBLICATIONS

Xu, et al., Proceedings entitled "Semantic Class Induction for Language Model Adaptation in a Chinese Voice Search System," Published Jun. 27, 2010, and presented at the 2010 International Conference on Electrical and Control Engineering (ICECE); pp. 1872-1875; 4 pages.

(Continued)

*Primary Examiner* — Pierre-Louis Desir
*Assistant Examiner* — Anne Thomas-Homescu
(74) *Attorney, Agent, or Firm* — Steven Spellman; Danielle Johnston-Holmes; Micky Minhas

(57) ABSTRACT

Query history expansion may be provided. Upon receiving a spoken query from a user, an adapted language model may be applied to convert the spoken query to text. The adapted language model may comprise a plurality of queries interpolated from the user's previous queries and queries associated with other users. The spoken query may be executed and the results of the spoken query may be provided to the user.

20 Claims, 3 Drawing Sheets

(56) References Cited

U.S. PATENT DOCUMENTS

| | | | |
|---|---|---|---|
| 2005/0165602 A1* | 7/2005 | Cote et al. | 704/9 |
| 2006/0015341 A1* | 1/2006 | Baker | 704/255 |
| 2006/0190253 A1* | 8/2006 | Hakkani-Tur et al. | 704/243 |
| 2006/0290535 A1* | 12/2006 | Thiesson et al. | 341/22 |
| 2007/0106685 A1* | 5/2007 | Houh et al. | 707/102 |
| 2007/0150856 A1* | 6/2007 | Warner et al. | 717/106 |
| 2007/0208719 A1* | 9/2007 | Tran | 707/3 |
| 2007/0219779 A1* | 9/2007 | Kojima | 704/9 |
| 2007/0233487 A1* | 10/2007 | Cohen et al. | 704/255 |
| 2008/0071533 A1* | 3/2008 | Cave et al. | 704/235 |
| 2008/0153465 A1 | 6/2008 | Evermann et al. | |
| 2008/0154612 A1* | 6/2008 | Evermann et al. | 704/275 |
| 2008/0288465 A1* | 11/2008 | Payton et al. | 707/3 |
| 2009/0006345 A1 | 1/2009 | Platt et al. | |
| 2009/0030688 A1* | 1/2009 | Cerra et al. | 704/243 |
| 2009/0030697 A1* | 1/2009 | Cerra et al. | 704/275 |
| 2009/0037398 A1* | 2/2009 | Horvitz et al. | 707/4 |
| 2009/0055380 A1* | 2/2009 | Peng et al. | 707/5 |
| 2009/0119256 A1* | 5/2009 | Waters et al. | 707/3 |
| 2009/0287626 A1 | 11/2009 | Paek et al. | |
| 2009/0292540 A1* | 11/2009 | Liu et al. | 704/251 |
| 2010/0070263 A1* | 3/2010 | Goto et al. | 704/8 |
| 2010/0185448 A1* | 7/2010 | Meisel | 704/256.1 |
| 2010/0241418 A1* | 9/2010 | Maeda et al. | 704/9 |
| 2010/0324901 A1* | 12/2010 | Carter et al. | 704/255 |
| 2011/0066634 A1* | 3/2011 | Phillips et al. | 707/769 |
| 2011/0099013 A1* | 4/2011 | Melamed et al. | 704/255 |
| 2011/0153324 A1* | 6/2011 | Ballinger et al. | 704/235 |
| 2011/0213761 A1* | 9/2011 | Song et al. | 707/706 |
| 2011/0295854 A1* | 12/2011 | Chiticariu et al. | 707/737 |
| 2012/0029910 A1* | 2/2012 | Medlock et al. | 704/9 |
| 2012/0047135 A1* | 2/2012 | Hansson et al. | 707/731 |
| 2012/0054171 A1* | 3/2012 | Gosset et al. | 707/709 |
| 2012/0101817 A1* | 4/2012 | Mocenigo et al. | 704/231 |
| 2012/0143605 A1* | 6/2012 | Thorsen et al. | 704/235 |
| 2012/0143858 A1* | 6/2012 | Vaananen | 707/723 |
| 2012/0232885 A1* | 9/2012 | Barbosa et al. | 704/9 |
| 2012/0232902 A1* | 9/2012 | Bocchieri et al. | 704/243 |
| 2012/0259636 A1* | 10/2012 | Sejnoha et al. | 704/235 |
| 2013/0018865 A1* | 1/2013 | Regan et al. | 707/706 |
| 2013/0019202 A1* | 1/2013 | Regan et al. | 715/810 |
| 2013/0080423 A1* | 3/2013 | Parikh et al. | 707/722 |
| 2013/0086029 A1* | 4/2013 | Hebert | 707/706 |
| 2013/0346077 A1* | 12/2013 | Mengibar et al. | 704/235 |
| 2015/0100314 A1* | 4/2015 | Phillips et al. | 704/235 |

OTHER PUBLICATIONS

Franz, et al., Abstract entitled "Searching the Web by Voice," retrieved Jul. 14, 2011; 5 pages.

Furui, Sadaoki. Proceedings entitled "Automatic Speech Recognition and its Application to Information Extraction" Published Jun. 26, 1999, and presented at the $37_{th}$ Meeting of ACL; pp. 11-20; 10 pages.

* cited by examiner

USER QUERY HISTORY EXPANSION FOR IMPROVING LANGUAGE MODEL ADAPTATION

BACKGROUND

Adaptation of a language model may be based on a user's historic inputs to a speech recognition algorithm. Conventional language model adaptation has been used in desktop dictation and other applications that can accumulate a significant amount of user historic voice input and related text, with or without supervision. However, this approach allows for only limited accuracy gain in tasks where large amounts of prior history are unavailable, such as voice search tasks.

SUMMARY

This Summary is provided to introduce a selection of concepts in a simplified form that are further described below in the Detailed Description. This Summary is not intended to identify key features or essential features of the claimed subject matter. Nor is this Summary intended to be used to limit the claimed subject matter's scope.

Query history expansion may be provided. Upon receiving a spoken query from a user, an adapted language model may be applied to convert the spoken query to text. The adapted language model may comprise a plurality of queries interpolated from the user's previous queries and queries associated with other users. The spoken query may be executed and the results of the spoken query may be provided to the user.

Both the foregoing general description and the following detailed description provide examples and are explanatory only. Accordingly, the foregoing general description and the following detailed description should not be considered to be restrictive. Further, features or variations may be provided in addition to those set forth herein. For example, embodiments may be directed to various feature combinations and subcombinations described in the detailed description.

BRIEF DESCRIPTION OF THE DRAWINGS

The accompanying drawings, which are incorporated in and constitute a part of this disclosure, illustrate various embodiments of the present invention. In the drawings.

DETAILED DESCRIPTION

Figure 1:
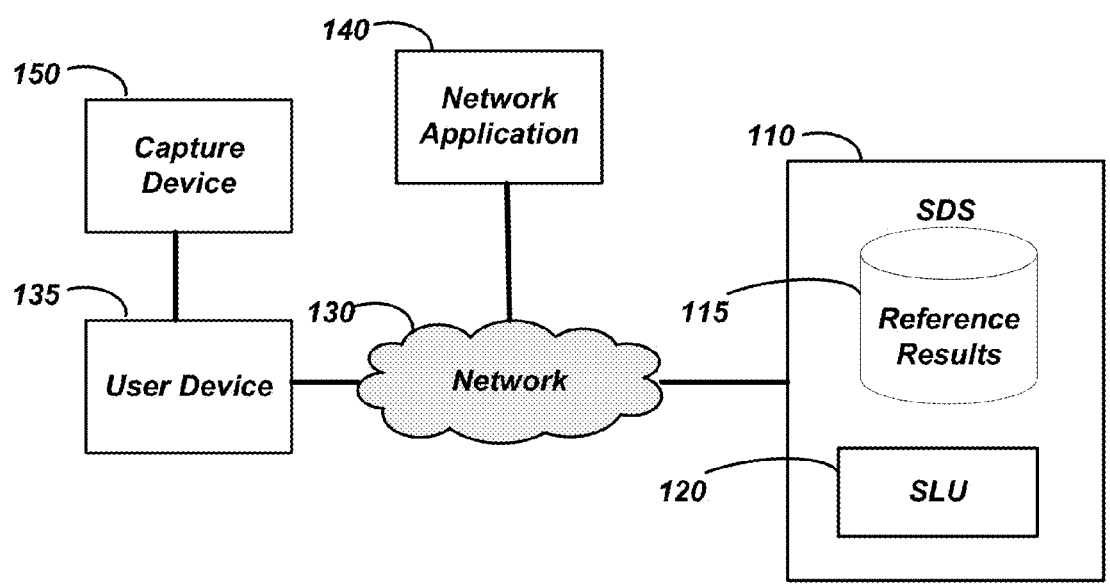
FIG. 1 is a block diagram of an operating environment.

The following detailed description refers to the accompanying drawings. Wherever possible, the same reference numbers are used in the drawings and the following description to refer to the same or similar elements. While embodiments of the invention may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the invention.

For a voice search application, a user's historic search queries, including both voice and text requests, may be used to create an adaptation data set that includes not only the historic search queries themselves but also other queries considered relevant for the original historic queries. The augmentation of the original query set may be performed, for example, by leveraging the user-query association data to either incorporate historic queries from other users who share some commonality with the target user and/or to identify a cluster of users that the target user is similar to and adopt the pooled adaptation model from those users in the cluster. For a second example, the query-click association data may be leveraged to identify all other queries that share the same click URLs with a user's historic queries and/or other queries that are within a certain distance from the historic queries in a query-click graph. A query-click graph may comprise a bipartite graph with queries on one side and clicked documents on the other. A user's query may be associated with a document, which may be represented by a uniform resource locator (URL), if the querying user selects that link. Yet another example may comprise selecting queries from a large set of general search queries that are similar to the user's historic queries in terms of lexical match, word and phrase class match, and/or match in some latent attributes such as query topics.

FIG. 1 is a block diagram of an operating environment 100 for providing query history expansion comprising a spoken dialog system (SDS) 110. SDS 110 may comprise a plurality of reference results 115 and a spoken language understanding application 120. SDS 110 may be operative to interact, directly and/or over a network 130, with a user device 135 and/or a network application 140, such as a search engine. Network 130 may comprise a private network, such as a corporate local area network, a cellular network, and/or a public network such as the Internet. User device 135 may comprise an electronic communications device such as a computer, laptop, cellular and/or IP phone, tablet, game console and/or other device. User device 135 may be coupled to a capture device 150 that may be operative to record a user and capture spoken words, motions and/or gestures made by the user, such as with a camera and/or microphone. User device 135 may be further operative to capture other inputs from the user such as by a keyboard, touchscreen and/or mouse (not pictured). Consistent with embodiments of the invention, capture device 150 may comprise any speech and/or motion detection device capable of detecting the speech and/or actions of the user. For example, capture device 150 may comprise a Microsoft® Kinect® motion capture device comprising a plurality of cameras and a plurality of microphones.

Figure 2:
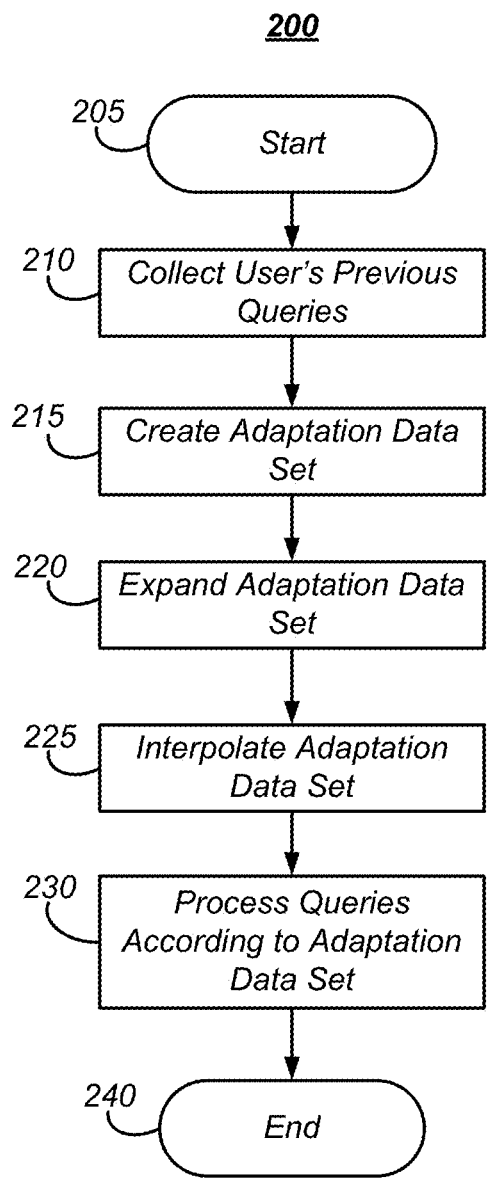
FIG. 2 is a flow chart of a method for providing query history expansion.

FIG. 2 is a flow chart setting forth the general stages involved in a method 200 consistent with an embodiment of the invention for providing query history expansion. Method 200 may be implemented using a computing device 300 as described in more detail below with respect to FIG. 3. Ways to implement the stages of method 200 will be described in greater detail below. Method 200 may begin at starting block 205 and proceed to stage 210 where computing device 300 may collect a plurality of previous search queries associated with a user. For example, the plurality of previous search queries may have been received as gestures, spoken queries, typed queries, and/or queries selected via an input device.

Method 200 may then advance to stage 215 where computing device 300 may create an adaptation data set associated with the user according to the plurality of previous queries. For example, SLU module 120 may use the previous queries in a language model as training data to aid in converting new queries received from the user to text. Upon receiving a query such as "weather in Seattle," the language model may enable SLU module 120 to convert the query to text with greater accuracy and/or confidence by recognizing that the same query has been received before.

Method 200 may then advance to stage 220 where computing device 300 may expand the adaptation data set by adding additional queries from other users. For example, queries may be added from users who share at least one common characteristic with the user, where each of the new queries comprises a lexical similarity to at least one of the user's previous queries, and/or where each of the new queries is associated with the same web link result as one of the user's previous search queries.

Method 200 may then advance to stage 225 where computing device 300 may interpolate the user's previous queries and the queries from the other users into the adaptation data set for a personalized language model. For example, duplicate entries may be recognized and weighted more heavily as being more likely to occur.

Method 200 may then advance to stage 230 where computing device 300 may process queries from the user according to the adapted data set. For example, upon receiving a new search query spoken by the user, SLU 120 may convert the search query to text according to the personalized language model, execute the converted query, and provide at least one result of the executed query to the user. Method 200 may then end at stage 240.

An embodiment consistent with the invention may comprise a system for providing query history expansion. The system may comprise a memory storage and a processing unit coupled to the memory storage. The processing unit may be operative to receive a spoken query from a user apply an adapted language model to convert the spoken query to text, execute the spoken query, and provide at least one result of the spoken query to the user.

Another embodiment consistent with the invention may comprise a system for providing query history expansion. The system may comprise a memory storage and a processing unit coupled to the memory storage. The processing unit may be operative to receive a plurality of previous queries associated with a user, retrieve a second plurality of previous queries associated with a plurality of other users, interpolate at least a subset of the second plurality of previous queries with the plurality of previous queries associated with the user, create an adapted language model according to the interpolated queries, receive a new query from the user, and convert the new query into a text string according to the adapted language model. The converted query may then be provided to a spoken language understanding (SLU) application that may, for example, process the query and return a plurality of search results to the user. The processing unit may be further operative to annotate each of the second plurality of queries and each of the plurality of previous queries associated with the user and select the at least a subset of the second plurality of previous queries for interpolation according to a common annotation between at least one of the second plurality of previous queries and at least one of the plurality of queries associated with the user. For example, the user may be associated with a previous query of "weather in San Francisco." Such a query may be annotated, such as with XML tags, as "weather in <city>San Francisco</city>." A query among the other users' queries may comprise "weather in Seattle," which may be annotated as "weather in <city>Seattle</city>." This may permit the system to match the two queries by their similar tags, and may enable the system to expand the interpolated query set according to latent attributes such as the topics of the queries even where the literal subjects (e.g., Seattle and San Francisco) are not lexically similar.

Yet another embodiment consistent with the invention may comprise a system for providing query history expansion. The system may comprise a memory storage and a processing unit coupled to the memory storage. The processing unit may be operative to collect a plurality of previous search queries associated with a user and expand the adaptation data set by adding a plurality of historical queries from a plurality of users, wherein the plurality of users share at least one common characteristic with the user, adding a second plurality of queries, wherein each of the second the plurality of queries comprises a lexical similarity to at least one of the previous search queries associated with the user, and adding a third plurality of queries, wherein each of the third plurality of historical queries is associated with a web link result, wherein each web link result is further associated with at least one of the plurality of previous search queries. The processing unit may be further operative to interpolate each of the plurality of previous search queries, the plurality of historical queries, the second plurality of queries, and the third plurality of queries into an adaptation data set for a personalized language model and, upon receiving a new search query spoken by the user, convert the search query to text according to the personalized language model, execute the converted query, and provide at least one result of the executed query to the user.

Figure 3:
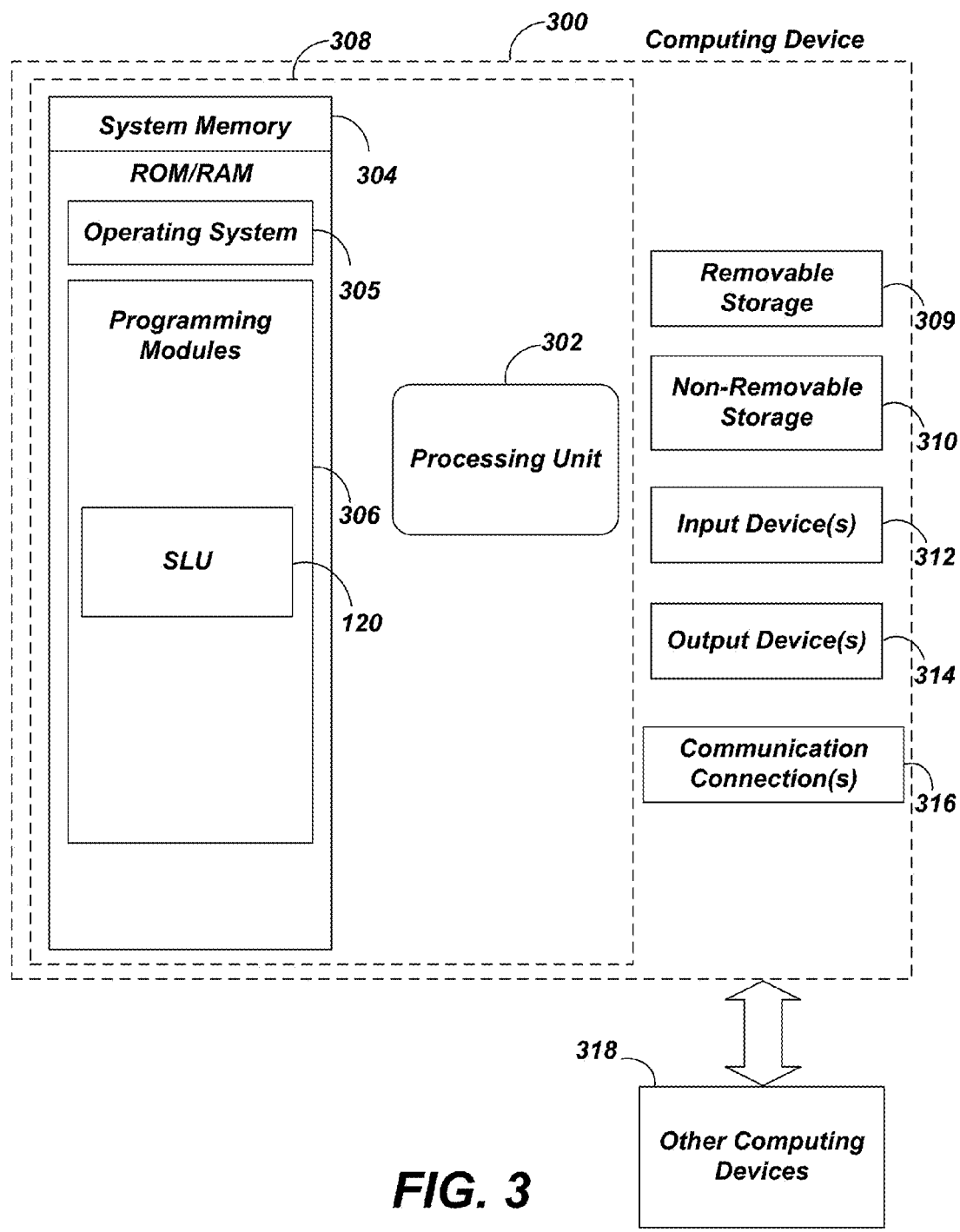
FIG. 3 is a block diagram of a computing device.

The embodiments and functionalities described herein may operate via a multitude of computing systems, including wired and wireless computing systems, mobile computing systems (e.g., mobile telephones, tablet or slate type computers, laptop computers, etc.). In addition, the embodiments and functionalities described herein may operate over distributed systems, where application functionality, memory, data storage and retrieval and various processing functions may be operated remotely from each other over a distributed computing network, such as the Internet or an intranet. User interfaces and information of various types may be displayed via on-board computing device displays or via remote display units associated with one or more computing devices. For example user interfaces and information of various types may be displayed and interacted with on a wall surface onto which user interfaces and information of various types are projected. Interaction with the multitude of computing systems with which embodiments of the invention may be practiced include, keystroke entry, touch screen entry, voice or other audio entry, gesture entry where an associated computing device is equipped with detection (e.g., camera) functionality for capturing and interpreting user gestures for controlling the functionality of the computing device, and the like. FIG. 3 and the associated descriptions provide a discussion of a variety of operating environments in which embodiments of the invention may be practiced. However, the devices and systems illustrated and discussed with respect to FIG. 3 are for purposes of example and illustration and are not limiting of a vast number of computing device configurations that may be utilized for practicing embodiments of the invention, described herein.

FIG. 3 is a block diagram of a system including computing device 300. Consistent with an embodiment of the invention, the aforementioned memory storage and processing unit may be implemented in a computing device, such as computing device 300 of FIG. 3. Any suitable combination of hardware, software, or firmware may be used to implement the memory storage and processing unit. For example, the memory storage and processing unit may be implemented with computing device 300 or any of other computing devices 318, in combination with computing device 300. The aforementioned system, device, and processors are examples and other systems, devices, and processors may comprise the aforementioned memory storage and processing unit, consistent with embodiments of the invention. Furthermore, computing device 300 may comprise operating environment 300 as described above.

Methods described in this specification may operate in other environments and are not limited to computing device 300.

With reference to FIG. 3, a system consistent with an embodiment of the invention may include a computing device, such as computing device 300. In a basic configuration, computing device 300 may include at least one processing unit 302 and a system memory 304. Depending on the configuration and type of computing device, system memory 304 may comprise, but is not limited to, volatile (e.g. random access memory (RAM)), non-volatile (e.g. read-only memory (ROM)), flash memory, or any combination. System memory 304 may include operating system 305, one or more programming modules 306, and may include Spoken Language Understanding module 120. Operating system 305, for example, may be suitable for controlling computing device 300's operation. Furthermore, embodiments of the invention may be practiced in conjunction with a graphics library, other operating systems, or any other application program and is not limited to any particular application or system. This basic configuration is illustrated in FIG. 3 by those components within a dashed line 308.

Computing device 300 may have additional features or functionality. For example, computing device 300 may also include additional data storage devices (removable and/or non-removable) such as, for example, magnetic disks, optical disks, or tape. Such additional storage is illustrated in FIG. 3 by a removable storage 309 and a non-removable storage 310. Computing device 300 may also contain a communication connection 316 that may allow device 300 to communicate with other computing devices 318, such as over a network in a distributed computing environment, for example, an intranet or the Internet. Communication connection 316 is one example of communication media.

The term computer readable media as used herein may include computer storage media. Computer storage media may include volatile and nonvolatile, removable and non-removable media implemented in any method or technology for storage of information, such as computer readable instructions, data structures, program modules, or other data. System memory 304, removable storage 309, and non-removable storage 310 are all computer storage media examples (i.e., memory storage.) Computer storage media may include, but is not limited to, RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store information and which can be accessed by computing device 300. Any such computer storage media may be part of device 300. Computing device 300 may also have input device(s) 312 such as a keyboard, a mouse, a pen, a sound input device, a touch input device, etc. Output device(s) 314 such as a display, speakers, a printer, etc. may also be included. The aforementioned devices are examples and others may be used.

The term computer readable media as used herein may also include communication media. Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media.

As stated above, a number of program modules and data files may be stored in system memory 304, including operating system 305. While executing on processing unit 302, programming modules 306 (e.g., Spoken Language Understanding module 120) may perform processes and/or methods as described above. The aforementioned process is an example, and processing unit 302 may perform other processes. Other programming modules that may be used in accordance with embodiments of the present invention may include electronic mail and contacts applications, word processing applications, spreadsheet applications, database applications, slide presentation applications, drawing or computer-aided application programs, etc.

Generally, consistent with embodiments of the invention, program modules may include routines, programs, components, data structures, and other types of structures that may perform particular tasks or that may implement particular abstract data types. Moreover, embodiments of the invention may be practiced with other computer system configurations, including hand-held devices, multiprocessor systems, microprocessor-based or programmable consumer electronics, minicomputers, mainframe computers, and the like. Embodiments of the invention may also be practiced in distributed computing environments where tasks are performed by remote processing devices that are linked through a communications network. In a distributed computing environment, program modules may be located in both local and remote memory storage devices.

Furthermore, embodiments of the invention may be practiced in an electrical circuit comprising discrete electronic elements, packaged or integrated electronic chips containing logic gates, a circuit utilizing a microprocessor, or on a single chip containing electronic elements or microprocessors. Embodiments of the invention may also be practiced using other technologies capable of performing logical operations such as, for example, AND, OR, and NOT, including but not limited to mechanical, optical, fluidic, and quantum technologies. In addition, embodiments of the invention may be practiced within a general purpose computer or in any other circuits or systems.

Embodiments of the invention, for example, may be implemented as a computer process (method), a computing system, or as an article of manufacture, such as a computer program product or computer readable media. The computer program product may be a computer storage media readable by a computer system and encoding a computer program of instructions for executing a computer process. The computer program product may also be a propagated signal on a carrier readable by a computing system and encoding a computer program of instructions for executing a computer process. Accordingly, the present invention may be embodied in hardware and/or in software (including firmware, resident software, micro-code, etc.). In other words, embodiments of the present invention may take the form of a computer program product on a computer-usable or computer-readable storage medium having computer-usable or computer-readable program code embodied in the medium for use by or in connection with an instruction execution system. A computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. More specific computer-readable medium examples (a non-exhaustive list), the computer-readable medium may include the following: an electrical connection having one or more wires, a portable computer diskette, a random access memory (RAM), a read-only memory (ROM), an erasable programmable read-only memory (EPROM or Flash memory), an optical fiber, and a portable compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

Embodiments of the invention may be practiced via a system-on-a-chip (SOC) where each or many of the components illustrated in FIG. 3 may be integrated onto a single integrated circuit. Such an SOC device may include one or more processing units, graphics units, communications units, system virtualization units and various application functionalities, all of which may be integrated (or "burned") onto the chip substrate as a single integrated circuit. When operating via an SOC, the functionality, described herein, with respect to training and/or interacting with SDS 110 may operate via application-specific logic integrated with other components of the computing device/system X on the single integrated circuit (chip).

Embodiments of the present invention, for example, are described above with reference to block diagrams and/or operational illustrations of methods, systems, and computer program products according to embodiments of the invention. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

While certain embodiments of the invention have been described, other embodiments may exist. Furthermore, although embodiments of the present invention have been described as being associated with data stored in memory and other storage mediums, data can also be stored on or read from other types of computer-readable media, such as secondary storage devices, like hard disks, floppy disks, or a CD-ROM, a carrier wave from the Internet, or other forms of RAM or ROM. Further, the disclosed methods' stages may be modified in any manner, including by reordering stages and/or inserting or deleting stages, without departing from the invention.

All rights including copyrights in the code included herein are vested in and the property of the Applicants. The Applicants retain and reserve all rights in the code included herein, and grant permission to reproduce the material only in connection with reproduction of the granted patent and for no other purpose.

While certain embodiments of the invention have been described, other embodiments may exist. While the specification includes examples, the invention's scope is indicated by the following claims. Furthermore, while the specification has been described in language specific to structural features and/or methodological acts, the claims are not limited to the features or acts described above. Rather, the specific features and acts described above are disclosed as example for embodiments of the invention.

We claim:

1. A method, implemented by a computing device, for providing a query history expansion, the method comprising:
   receiving a spoken query from a user;
   creating an adapted language model that includes interpolating previous queries associated with the user and previous queries associated with a plurality of other users that share at least one common characteristic, wherein the previous queries of the plurality of other users is identified based on queries from the plurality of other users that contain click URLs as the user's previous queries and identified based on queries of the plurality of other users that are within a threshold distance of the user's previous queries;
   converting the spoken query to text and applying the created adapted language model to the spoken query to generate at least one result for the spoken query; and
   providing the at least one result of the converted spoken query to the user.

2. The method of claim 1, wherein the adapted language model is specific to the user.

3. The method of claim 1, wherein the adapted language model is shared among a plurality of users.

4. The method of claim 3, further comprising grouping the plurality of users according to a similarity in at least one previous query.

5. The method of claim 3, further comprising grouping the plurality of users according to at least one common characteristic shared among the plurality of users.

6. The method of claim 5, wherein the at least one common characteristic comprises at least one of the following: a common organization association, a common demographic characteristic, a common spoken language, and a common geographic home area.

7. The method of claim 1, wherein the adapted language model comprises at least one previous query by the user and at least one expanded query associated with at least one second user.

8. The method of claim 7, wherein the at least one previous query of the user further comprises a same previous query of the at least one second user.

9. The method of claim 1, wherein the adapted language model comprises at least one expanded query associated with a clicked web link, wherein the clicked web link is also associated with at least one previous query of the user.

10. The method of claim 1, wherein the adapted language model comprises a plurality of expanded queries, wherein each of the plurality of expanded queries comprise a lexical similarity to at least one previous query of the user.

11. The method of claim 1, wherein the adapted language model comprises a plurality of expanded queries, wherein each of the plurality of expanded queries are associated with a search domain associated with at least one previous query of the user.

12. A system for providing a query history expansion, the system comprising:
   a memory storage; and
   a processing unit coupled to the memory storage, wherein the processing unit is operable to:
   receive a plurality of previous queries associated with a user,
   create an adapted language model that includes interpolating previous queries associated with the user and previous queries associated with a plurality of other users that share at least one common characteristic, wherein the previous queries of the plurality of other users is identified based on queries from the plurality of other users that contain click URLs as the user's previous queries and identified based on queries of the plurality of other users that are within a threshold distance of the user's previous queries, receive a spoken query from the user, convert the spoken query into a text string and apply the created adapted language model to generate at least one result for the converted spoken query, and transmit the at least one result of the converted spoken query to the user.

13. The system of claim 12, wherein the adapted language model is shared among a second plurality of other users.

14. The system of claim 13, wherein the user and the second plurality of other users are each associated with at least one common characteristic.

15. The system of claim 14, wherein the at least one common characteristic comprises at least one of the following: a common organization association, a common demographic characteristic, a common spoken language, and a common geographic home area.

16. The system of claim 12, wherein the at least a subset of the second plurality of previous queries are selected according to a lexical similarity to at least one of the plurality of previous queries associated with the user.

17. The system of claim 12, wherein the processing unit is further operative to:

plot a query-click graph of the plurality of previous queries associated with the user and the second plurality of previous queries associated with the plurality of other users; and select the at least a subset of the second plurality of previous queries for interpolation according to a threshold distance between each of the second plurality of previous queries and at least one query of the plurality of previous queries associated with the user.

18. The system of claim 12, wherein the at least a subset of the second plurality of previous queries are selected according to a threshold value of overlap of query results associated with each of the second plurality of previous queries and at least one of the plurality of previous queries associated with the user.

19. The system of claim 12, wherein the processing unit is further operative to:

annotate each of the second plurality of queries and each of the plurality of previous queries associated with the user; and select the at least a subset of the second plurality of previous queries for interpolation according to a common annotation between at least one of the second plurality of previous queries and at least one of the plurality of queries associated with the user.

20. A computer-readable storage device which stores a set of instructions which when executed performs a method for providing a query history expansion, the method executed by the set of instructions comprising:

collecting a plurality of previous search queries associated with a user, wherein the plurality of previous search queries comprises at least one of the following: a previously spoken query, a previously typed query, and a previously selected query;

creating an adapted language model that includes interpolating previous queries associated with the user and previous queries associated with a plurality of other users that share at least one common characteristic, wherein the previous queries of the plurality of other users is identified based on queries from the plurality of other users that contain click URLs as the user's previous queries and identified based on queries of the plurality of other users that are within a threshold distance of the user's previous queries, receiving a search query spoken by the user;

converting the spoken query into a text string and applying the created adapted language model to generate at least one result for the converted spoken query, and providing the at least one result of the converted search query to the user.

* * * * *